United States Patent
Gershuni et al.

(10) Patent No.: US 12,405,927 B2
(45) Date of Patent: Sep. 2, 2025

(54) DATABASE OBJECT LIFECYCLE STATES

(71) Applicant: Salesforce, Inc., San Francisco, CA (US)

(72) Inventors: David Gershuni, Carmel, IN (US); Punit B. Shah, Castro Valley, CA (US); Mikhail Lychagin, San Francisco, CA (US); Rama K. Korlapati, El Segundo, CA (US); Rui Zhang, Fremont, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/411,638

(22) Filed: Jan. 12, 2024

(65) Prior Publication Data

US 2025/0231921 A1 Jul. 17, 2025

(51) Int. Cl.
*G06F 16/21* (2019.01)
*G06F 16/2455* (2019.01)

(52) U.S. Cl.
CPC .......... *G06F 16/213* (2019.01); *G06F 16/219* (2019.01); *G06F 16/24552* (2019.01)

(58) Field of Classification Search
CPC .................. G06F 16/213; G06F 16/219; G06F 16/24552; G06F 16/211; G06F 16/1774; G06F 16/2358; G06F 8/65; G06F 16/2322; G06F 16/2282; G06F 16/2329; G06F 9/44536; G06F 8/71; G06F 40/197; G06F 16/1873
USPC ....................................................... 707/803
See application file for complete search history.

(56) References Cited

U.S. PATENT DOCUMENTS

| | | | |
|---|---|---|---|
| 11,176,138 B2 | 11/2021 | Shah | |
| 11,347,713 B2 | 5/2022 | Cohen | |
| 11,416,470 B2 | 8/2022 | Chatterjee | |
| 11,573,713 B1 | 2/2023 | Shah | |
| 2010/0312784 A1* | 12/2010 | Boyd | G06F 16/24552 707/769 |
| 2017/0185392 A1* | 6/2017 | Konrad | G06F 8/70 |
| 2019/0114253 A1 | 4/2019 | Wilding | |
| 2019/0294604 A1* | 9/2019 | Martinez | G06F 16/27 |
| 2021/0109907 A1* | 4/2021 | Chheda | G06F 16/2379 |
| 2021/0240710 A1 | 8/2021 | Korlapati | |
| 2023/0081900 A1* | 3/2023 | Werner | G06F 16/2379 707/703 |

(Continued)

*Primary Examiner* — Evan Aspinwall
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to updating a database schema. A computer system may store database schema versions for a database schema. A given schema version may have an active state or one of multiple non-active states. One of the schema versions may be a first schema version that is in the active state and the remaining schema versions may be in the non-active states. The computer system may receive updates to apply to the database schema. The computer system may transition a second schema version from a first non-active state that does not permit structural or content updates to a second non-active state that permits structural and content updates. The computer system may apply the updates to the second database schema version and then transition the second database schema version into the active state and the first database schema version into the first non-active state.

20 Claims, 7 Drawing Sheets

(56) References Cited

U.S. PATENT DOCUMENTS

| | | |
|---|---|---|
| 2023/0135823 A1 | 5/2023 | Zhang |
| 2023/0205760 A1* | 6/2023 | McHugh |
| 2024/0028567 A1* | 1/2024 | Dageville ............ G06F 16/2255 |
| 2024/0248884 A1* | 7/2024 | Hundt .................... G06F 16/211 |
| 2024/0281245 A1* | 8/2024 | Carru .................... G06F 9/4488 |

* cited by examiner

DATABASE OBJECT LIFECYCLE STATES

BACKGROUND

Technical Field

This disclosure relates generally to database systems and, more specifically, to various mechanisms for implementing lifecycle states for database objects.

Description of the Related Art

Enterprises routinely implement database management systems (or, simply "database systems") that enable users to store a collection of information in an organized manner that can be efficiently accessed and manipulated. The organization of data in those database systems is usually laid out by a database schema that defines the structure of the database and its database objects by specifying tables, columns, relationships, constraints, data types, etc. The database schema is used throughout the database's life, serving as a blueprint that informs interactions with the stored data. Accordingly, a database system can access data from the database objects (e.g., tables) in the database in accordance with the database schema. The database schema can be stored both in the database itself and locally cached in the memory of a database server of the database system to allow quicker access to schema information for interpreting records that are written to and read from the database objects.

DETAILED DESCRIPTION

Figure 1:
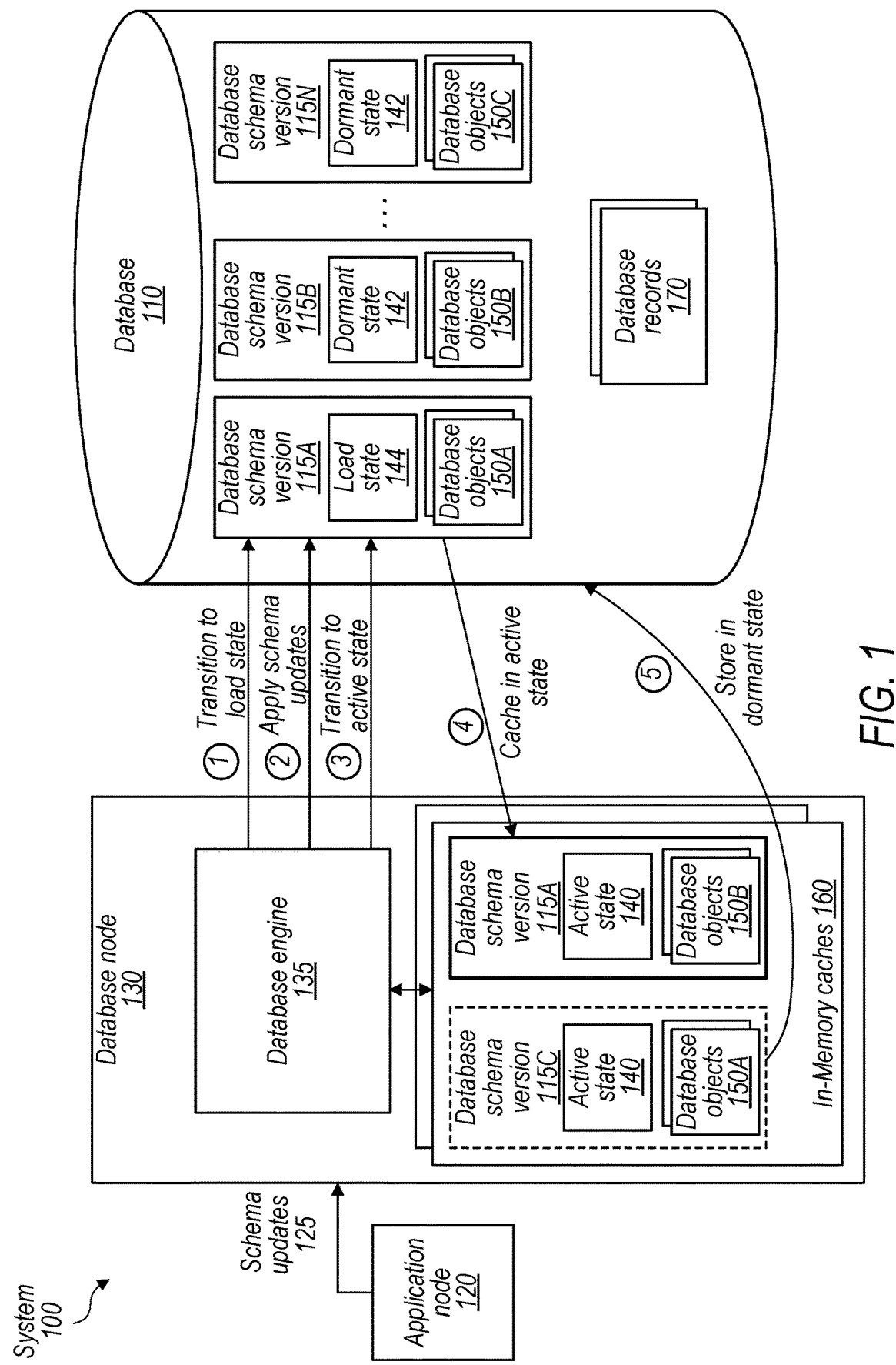
FIG. 1 is a block diagram illustrating example elements of a system having a database, an application node, and a database node that accesses the database in accordance with database schema versions of a database schema, according to some embodiments.

Application servers (also referred to as "application nodes") and other clients often rely on database systems to manage and retrieve structured information from a database to support tasks such as user authentication, data processing, content delivery, and real-time information access. Typically, an application node sends traffic to a database node in the form of requests to read and write data. Accordingly, the database node processes these requests, accesses data in the database, and returns the results of these requests to the application node. The database node manages the storage, retrieval, and organization of data based on the instructions received from the application node, serving as the intermediary between the application node and the underlying database. When servicing traffic, the database node references a database schema, which it can cache, to interpret how the data is organized, how different elements relate to each other, the rules governing their interactions, etc. Over time, the database schema may change due to various scenarios, such as changes in the data being stored, updates to the functionality of the application node or the database node, added performance optimizations, etc.

In many cases, directly updating the database schema can disrupt application traffic or otherwise hinder access to data in the database, causing undesired downtime. In order to avoid that downtime, in various embodiments, a database schema rotation is implemented in which a database node rotates through multiple instances of the database schema that correspond to different versions of that schema-referred to as "database schema versions." Accordingly, the database node can process traffic using a current database schema version while updates to the database schema are applied to the next database schema instance/version in the rotation that is not being used to service traffic. In various embodiments, each database schema version has its own state, with at least one database schema version being in an "active" state and thus used to service traffic from application users while other database schema versions are in a variety of "non-active" states that are part of a database schema lifecycle.

The non-active states can include a "dormant" state that does not permit any structural or content updates to a database schema version. As used herein, structural and content updates refer to updates that change the structure of a database schema version (e.g., add a column to a table of the database schema version) or the content of the database schema version (e.g., add a row to a table). Structural and content updates are not intended to refer to updates that change non-structural properties of a database schema version, such as its name and its state. Thus, a data definition language (DDL) statement that changes a database schema version's state can be performed on a database schema version in the dormant state so that it can be transitioned to other states, while a DDL statement that adds a new column to a table of the database schema version (a structural change) is blocked while that database schema version is in the dormant state. But in some embodiments, the dormant state does not permit any changes to a database schema version except to change its state. The non-active states can also include a "load" state that permits structural and content updates to a database schema version.

When there is a new update that affects the database schema, in various embodiments, the update is applied to one of the non-active database schema versions instead of an active database schema version so that there is zero downtime. First, the non-active database schema version may be transitioned from the dormant state that does not permit structural or content updates to that database schema version to the load state that permits updates to the database schema version. Then, the database node may perform the requisite changes on the non-active database schema version while still servicing traffic using the active database schema version. When the non-active database schema version is ready, a database schema version rotation can occur from the active database schema version to the updated database schema version, where, among other operations, incoming traffic is redirected from the active database schema version to the updated database schema version. The updated database schema version is transitioned into the active state and the previously-active database schema version is transitioned into the dormant state. This approach can allow for zero (or almost zero downtime) to application users as the database schema version being used to service traffic does not undergo the updates and thus can continue to be used while the updates are applied to another database schema version in the rotation.

Furthermore, as will be described below, assigning states to database schema versions may further protect and allow for optimizations to the database. A database schema version's state can be used to signal to the database node that the schema version is in a particular stage of the lifecycle and thus should be protected and/or handled in a certain way. For example, in many cases, structural and content commands (e.g., DDL statements) are issued to the database node that unintentionally target the wrong schema version or the correct schema version but at the wrong time, causing undesired effects. Accordingly, in various embodiments, a database schema version is placed in the dormant state to cause the database node to prevent structural or content updates to that database schema version—the dormant state thus signals the database node to leave the schema version intact. As another example, the load state may indicate to the database node that the database schema version is currently being updated and thus structural and content changes are permitted on that database schema version. By knowing that a database schema version is being updated, this can allow for various optimizations during the load state, such as suppressing cache invalidation messages resulting from updates to the database schema version whose data is not stored in cache(s) of the database node that are used to store database schema objects.

In various embodiments described below, a system includes a database, an application node, and a database node that executes database processes to service transaction requests from the application node to perform database operations on data stored within the database. The database can store multiple database schema versions of a database schema, each having a state and defining one or more database objects. During operation, the database node may access, from the database, a database schema version that is in the active state and store it within one or more in-memory caches accessible to the database processes. Subsequently, the database node may receive one or more updates to apply to the database schema. As part of applying the updates, the database node may transition from the active database schema version residing in the one or more in-memory caches to a non-active database schema stored in the database to which the one or more updates are applied.

Turning now to FIG. 1, a block diagram of a system 100 is shown. System 100 includes a set of components that may be implemented via hardware or a combination of hardware and software. In the illustrated embodiment, system 100 comprises a database 110, an application node 120, and a database node 130. As shown, database node 130 includes a database engine 135 and in-memory caches 160 that are used to cache database schema versions 115. Also as shown, database 110 includes database schema versions 115A-N and database records 170. In some embodiments, system 100 is implemented differently than shown. For example, system 100 might include multiple application nodes 120 and/or database nodes 130, application node 120 itself may also include a set of in-memory caches that are used to cache at least a portion of a database schema version 115, etc.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, databases (e.g., database 110), and other entities of system 100. In various embodiments, system 100 is implemented using a cloud infrastructure that is provided by a cloud provider. Database 110, application node 120, and database node 130 may thus execute on and utilize the available cloud resources of that cloud infrastructure (e.g., computing resources, storage resources, network resources, etc.) to facilitate their operation. For example, the components of database node 130 may execute in a virtual environment that is hosted on server-based hardware included within a datacenter of the cloud provider. But in some embodiments, system 100 is implemented utilizing a local or private infrastructure as opposed to a public cloud.

Database 110, in various embodiments, is a collection of information that is organized in a manner that allows for access, storage, and manipulation of that information. Accordingly, database 110 may include supporting software (e.g., storage nodes) that enable database node 130 to carry out operations (e.g., accessing, storing, etc.) on the information stored at database 110. In various embodiments, database 110 is implemented using a single or multiple storage devices that are connected together on a network (e.g., a storage attached network (SAN)) and configured to redundantly store information in order to prevent data loss. The storage devices may store data persistently and thus database 110 may serve as a persistent storage for system 100. In various embodiments, data written to database 110 by a database node 130 is accessible to other database nodes 130 within a multi-node configuration. The data may include database records 170 comprising key-value pairs having data and a corresponding key that can be used to look up the associated record. For example, a database record 170 may correspond to a row in a database table and specify values for one or more attributes/fields of that table. Database 110 also stores multiple database schema versions 115 of a database schema.

A database schema, in various embodiments, is metadata that describes various types of database objects associated with database 110, such as tables, indexes, procedures, triggers, views, and functions. Accordingly, the database schema may be used by database node 130 to access, interpret, and maintain data stored at database 110. In various embodiments, database schema versions 115 are instances of the database schema that correspond to different versions of that database schema. In the illustrated embodiment, database schema versions 115 include database objects 150 (e.g., tables that form the structure of the database schema) having content that describes the aforementioned types of database objects associated with database 110. For example, a database object 150 of a database schema version 115 may be a table whose content specifies one or more database tables used to store user data. In various embodiments, database node 130 relies on database objects 150 and their content in order to execute queries in relation to database 110 for records 170. Example of database objects 150 are described in more detail with respect to FIG. 2B. When schema updates to the database schema are provided, they may be applied to one of the database schema versions 115, resulting in changes to the structure of the content of that database schema version. One or more database objects 150 may not change when the database schema is updated and thus two given database schema versions 115 may store one or more of the same database objects 150—as the version difference grows between any two database schema versions 115, the number of database objects 150 that are the same between them may decrease.

Furthermore, database schema versions 115 can also include a state (e.g., an active state 140, a dormant state 142, a load state 144) that indicates in which stage of a database schema lifecycle that a database schema version 115 is in. As discussed in more detail with respect to FIG. 2A, the database schema lifecycle may include multiple stages that form a cycle in which a database schema version 115 transitions between being used by database node 130 (and also application node 120) and being stored for a future use (where it is later updated to become the latest version of the database schema). This transition between actively being used and not actively being used, in various embodiments, is an aspect of a schema rotation in which database node 130 rotates through a set number of database schema versions 115 as updates to the database schema are received and applied. An example of a schema rotation is discussed in more detail with respect to FIG. 4. By having multiple database schema versions/instances 115 of a database schema that are rotated through, this may allow for system 100 to be rolled back under various scenarios (e.g., in the event that a software bug is discovered). An example of rotating backwards through a schema rotation is discussed in more detail with respect to FIG. 5.

Application node 120, in various embodiments, facilitates the execution of one or more applications that perform various functions and tasks, including interfacing with database node 130. In various embodiments, application node 120 is software that is executable on hardware, while in some embodiments, it encompasses both the hardware and the software. Examples of applications that may be implemented by application node 120 include a customer relationship management (CRM) service, a content streaming service, an email service, and a user-provided application (as opposed to an application provided by a provider of system 100). An application implemented by application node 120 may provide services to multiple tenants over a wide area network, such as the Internet, and may be hosted on or as part of a cloud service. In various embodiments, application node 120 interfaces with database node 130 to enable tenants to store and access their data at database 110. Application node 120 may establish database connections with database node 130 (e.g., using an API, such as Java Database Connectivity) through which transaction requests can be issued to database node 130. In various embodiments, a transaction request specifies a set of database statements (e.g., SQL statements) to be executed by database node 130. In some cases, updates to the applications that execute on application node 120 (or database node 130) may involve updating the database schema. Accordingly, application node 120 can issue schema updates 125 (e.g., in the form of SQL statements in a transaction request) to database node 130 to modify the database schema, resulting in database node 130 updating one of the non-active database schema versions 115.

Database node 130, in various embodiments, provides database services, such as data storage, data retrieval, and/or data manipulation. In various embodiments, database node 130 is software that is executable on hardware, while in some embodiments, it encompasses both the hardware and the software. The database services may be provided to components within system 100 and/or external to system 100. For example as mentioned, database node 130 may receive a transaction request from application node 120 to perform a database transaction on database 110. A database transaction, in various embodiments, is a logical unit of work (e.g., a specified set of database operations) to be performed in relation to database 110. For example, a database transaction may include a SELECT database statement and therefore processing the database transaction may involve database node 130 querying database records 170 of database 110.

Database engine 135, in various embodiments, is executable software that provides the various database services of database node 130 Accordingly, database engine 135 may process database transactions to read records 170 from and write records 170 to database 110. In order to process those database transactions, in various embodiments, database engine 135 relies on a database schema version 115. In particular, database engine 135 may consult database objects 150 of the active database schema version 115 that have been cached in in-memory caches 160 to process and validate the database transactions. Although two database schema versions 115 are depicted as active in in-memory caches 160 in FIG. 1, in some embodiments, only one database schema version 115 may be considered to be active by database engine 135 (e.g., used for servicing traffic, query validation, etc.). As will be discussed, database schema version 115C (shown in dashed lines) is active prior to applying schema updates 125, while database schema version 115A is stored and active after schema updates 125 are applied by database node 130.

In-memory caches 160, in various embodiments, are buffers that store data in memory (e.g., random access memory) of database node 130. HBase™ memstore is one example of an in-memory cache 160. Caches 160 may be located within a shared memory area designated by an operating system executing on database node 130. In-memory caches 160 may include one or more types of caches that facilitate transactions between database node 130, application nodes 120, and database 110. Example caches 160 include function caches for storing database functions, plan caches for storing query execution plans, and record caches for storing database records 170. In various embodiments, in-memory caches 160 are used to store a given database schema version 115 (its database objects 150 and their content) in entries that are associated with that database schema version 115. Moreover, a given cache 160 (e.g., plan cache, function cache, etc.) may include entries for multiple database schema versions 115, such as previously-active schema version 115C and newly-active schema version 115A.

As discussed, database node 130 consults a database schema version 115 of a database schema to execute queries on database 110 in order to fulfill requests by application node 120. But the database schema may need updating, even as database engine 135 is actively serving traffic from application node 120. It is desirable to perform the updates on the database schema without disrupting traffic from application node 120 (i.e., without performing the updates on the database schema version 115 that is currently being used to service traffic). Thus, a schema version rotation may be implemented in which a database schema version 115 is transitioned between being actively used and stored for future use.

In the illustrated embodiment, a schema version rotation occurs from database schema version 115C to database schema version 115A. As depicted in FIG. 1, database node 130 first receives schema updates 125 from application node 120, which instructs database node 130 to update the database schema. Then, database engine 135, in response to receiving those updates 125, transitions (e.g., using a DDL statement) database schema version 115A in database 110 from a dormant state 142 that does not allow updates 125 to a load state 144 that allows updates 125. Once the transition to load state 144 is complete, database engine 135 applies schema updates 125 on database schema version 115A. Database engine 135 then transitions database schema version 115A to active state 140 and subsequently stores at least a portion of it in in-memory caches 160. Database engine 135 further transitions database schema version 115C in database 110 to dormant state 114 and invalidates its cached data of caches 160. Database node thereafter uses the updated database schema version 155A to service incoming traffic. While the process discussed above describes a single schema update process, that process may be part of a wider database schema version lifecycle that may include rollbacks, transferring of traffic, etc.

These techniques may be advantageous over prior approaches as these techniques allow for schema updates with little or no downtime by performing the updates on other, non-active database schema versions while keeping the active database version(s) intact. Furthermore, using multiple database schema versions allows for an incremental upgrade process that has fewer disruptions, where each database schema version may only be slightly different from its preceding version in the rotation. Moreover, the use of a dormant state and a load state allows a database system to control when updates are applied to a database schema version (e.g., by preventing them in dormant state 142 but allowing them in load state 144) and the effects of applying those updates (e.g., preventing cache invalidation messages from being sent for the updates made during the load state).

Figure 2A:
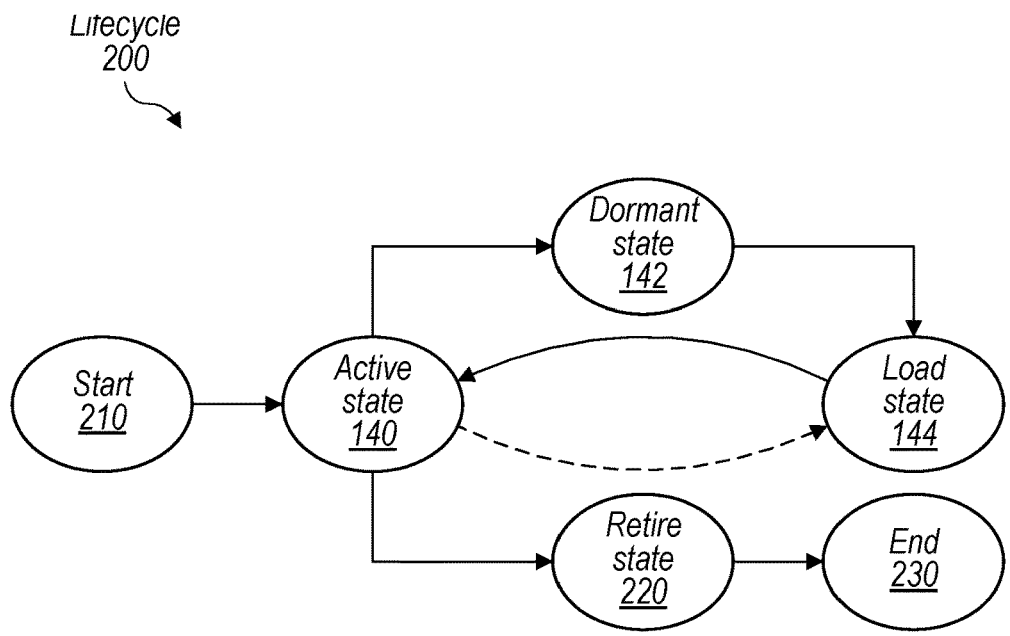
FIG. 2A is a state diagram illustrating example states and state transitions for a database schema version, according to some embodiments.

Turning now to FIG. 2A, a state diagram illustrating example states and state transitions for a database schema version is shown. In the illustrated embodiment, lifecycle 200 comprises active state 140, dormant state 142, load state 144, a start state 210, a retire state 220, and an end state 230. Although states are discussed in the context of database schema versions, database system 100 may maintain state information at one or more granularities for other various database objects, as described in more detail with respect to FIG. 2B.

As discussed, system 100 can maintain state information for database schema versions 115, which may be stored as part of those database schema versions 115. Accordingly, where a database schema version 115 is in lifecycle 200 is connoted by its current state, and system 100 treats that database schema version 115 accordingly. As illustrated, lifecycle 200 begins at start state 210 during creation and ends at end state 230, which informs system 100 to remove that database schema version 115. (Note that other lifecycles may be used with more or fewer states and/or transitions than shown.). Database node 130 may transition schema versions 115 as it cycles through them (e.g., during a database schema rotation) as a part of applying schema updates 125.

In various embodiments, a database schema version 115 is initially created in start state 210. While in start state 210, database node 130 may generate the structure and contents of the database schema version 115 by executing a set of scripts that are derived from a set of header files that define the structure and contents. Once that schema version 115 has been created, in some embodiments, the schema version 115 waits until database node 130 transitions it (e.g., via a SET database statement) to another state, such as active state 140 as shown. But in other embodiments, the schema version 115 inherits the state of a parent object (e.g., an application version) and automatically transitions from start state 210 to the parent's state, as is discussed in more detail with respect to FIG. 2B.

As discussed, the state of a database schema version 115, and more broadly a database object, can influence (e.g., allow, prevent, etc.) the operations performed by database node 130. For example, permissions may be granted based on both the state of a database schema version 115 and the type of database statement. The database statement types can include, for example, DDL statements (e.g., CREATE, DROP, etc.), Data Manipulation Language (DML) statements (e.g., INSERT, UPDATE, DELETE, etc.), Data Query Language (DQL) database (e.g., SELECT), Data Control Language (DCL) statements (e.g., GRANT, REVOKE), and Transaction Control Language (TCL) statements (e.g., COMMIT, etc.). Table 1 below includes an example policy that specifies the permissions granted to various states of a database object (e.g., a schema version 115, a table, etc.) with respect to DDL and DML commands. (Although permissions for other statement types may also be considered in other some embodiments.) As indicated by Table 1 for example, DDL commands cannot be performed on a database object (e.g., a table) that is in active state 140 while DML commands are permitted. The only DDL command that may be allowed across all states is a DDL command that changes the state of a database object, so that a database schema version 115 (for example) may be transitioned into different states.

TABLE 1

| State | DDL allowed? | DML allowed? |
| --- | --- | --- |
| Dormant 142 | Not allowed | Not allowed |
| Load 144 | Allowed | Not allowed |
| Active 140 | Not allowed | Allowed |
| Retire 220 | Not allowed, except to DROP objects | Not allowed |
| Maintain | Allowed | Allowed |

In various embodiments, a database schema version 115 in active state 140 is currently being used by database node 130 to service traffic. Active state 140 may prevent database node 130 from performing structural or content updates to the active database schema version 115. Note that, in some cases, some updates that do not change the structure nor the content of the active database schema version 115 may be allowed. For example, database node 130 may be allowed to transition the active database schema version 115 from active state 140 to dormant state 142. In some cases, system 100 may temporarily transition an active database schema version 115 to load state 144 and then perform updates on that database schema version 115 before returning it to active state 140. But in many cases, system 100 may transition another database schema version 115 to load state 144 and then active state 140 while also transitioning the active database schema version 115 to dormant state 142. In various embodiments, certain structural and/or content updates to the active database schema version 115 are allowed. For example, database node 130 may be permitted to insert a row for a new procedural function (a content change) into the active database schema version 115.

In various embodiments, a database schema version 115 in dormant state 142 is not being used to process requests issued to database node 130; however, it may be used again in the future. Since the dormant schema version should be kept intact (e.g., for rollback), database node 130 may prevent any attempt to modify it while it is in dormant state 142. Thus, in various embodiments, dormant state 142 protects schema versions 115 by preventing modifications that may be made by mistake (e.g., unrealized pending modifications made before a schema version 115 was placed in dormant state 142). Further, in various cases, database node 130 may have cached objects of a now-dormant schema version 115 that are no longer needed (as the schema version is not being used to process requests) and thus can be evicted as part of transitioning to dormant state 142. These cache evictions and other features of dormant state 142 are described in more detail with respect to FIG. 3A.

In various embodiments, a database schema version 115 in load state 144 is being modified in preparation to become the next database active schema version 115 with updated database objects 150. Accordingly, database node 130 is permitted to perform structural and content updates on a database schema version 115 in load state 144. In various embodiments, updates to the structure or the content of a database schema version 115 result in invalidation messages being sent to in-memory caches 160. For a database schema version 115 in load state 144, the invalidation messages resulting from updates applied to that database schema version 115 are suppressed. When the updates are complete and the schema version 115 is ready to be used in servicing traffic, schema version 115 may be transitioned from load state 144 to active state 140. Features of load state 144 are described in more detail with respect to FIG. 3B.

In various embodiments, a database schema version 115 in retire state 220 signals to the components of system 100 that the database schema version 115 is not to be used anymore in the schema rotation. In some embodiments, transitioning a database schema version 115 to retire state 220 results in purging all cached objects associated with the schema version. Once all operations associated with the retiring are complete, the schema version 115 is transitioned from retire state 220 to end state 230, after which it is deleted from database 110.

As noted, additional state transitions may be possible. As another example, database node 130 may decide to directly transition a schema version 115 from dormant state 142 to retire state 220. Conversely in some embodiments, system 100 may restrict some state transitions. For example, system 100 may prevent transitions of a schema version 115 in retire state 220 to an earlier state (e.g., active state 140, dormant state 142, etc.) as that schema version 115 had been marked for deletion.

Figure 2B:
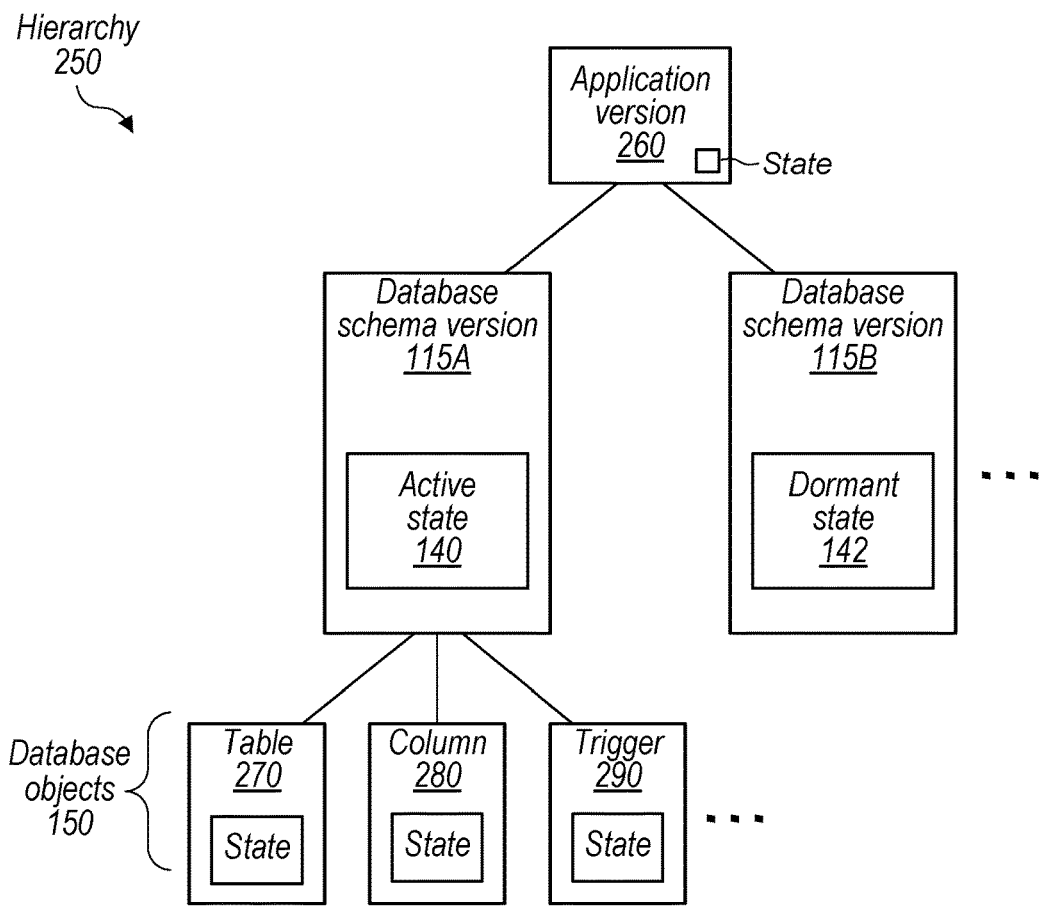
FIG. 2B is a block diagram illustrating example elements of a hierarchy of database constructs that can be assigned states, according to some embodiments.

Turning now to FIG. 2B, a block diagram illustrating example elements of a hierarchy 250 of database constructs that can be assigned states is shown. In the illustrated embodiment, hierarchy 250 includes a first level corresponding to an application version 260, a second level corresponding to database schema versions 115A-B associated with application version 260, and a third level corresponding to database objects 150 of database schema versions 115 of the second level. As further shown, those database objects 150 include a table 270, a column 280, and a trigger 290 (although more objects and/or object types may be included in a given schema version). In some embodiments, hierarchy 250 is implemented differently than shown. For example, the first, top level may correspond to a database schema version 115 while the second level may correspond to database objects 150 of that database schema version 115. Moreover, while not shown in FIG. 2B, in various embodiments, table 270, column 280, trigger 290, and other database objects 150 have children as well. Accordingly, while hierarchy 250 is shown as having three levels, hierarchy 250 may have any arbitrary number of levels.

As shown in FIG. 2B, each object of hierarchy 250 has a state. Due to the hierarchical nature of relationships between objects, a given object may inherit its state from its parent(s). This may be implemented, for example, as a specific "inherit" state that would be part of a different lifecycle than shown in FIG. 2A, where any object assigned the inherit state inherits its parent's state. But objects may also have their own states that differ from those of their parents. In break-glass scenarios for example, an object whose parent is in a state (e.g., active state 140) that usually prevents most updates may be temporarily overridden (e.g., transitioned to load state 144) to permit updates to that object. Although individual objects possess states, these states may not have uniform effect on different types of objects. For example, an unused index may inherit an active state 140 from its parent schema version 115 but still be dropped despite its inherited active state 140.

At the top of hierarchy 250 is application version 260, which governs multiple database schema versions 115. In some cases, application version 260 is used to perform updates that are larger in scale than those achieved through database schema version rotations. Thus, more incremental updates that marginally affect the underlying database schema may be performed using the methods described herein (e.g., schema rotation), while more significant updates may be performed by creating a new application version 260 that has its own set of database schema versions 115. Thus, although application version 260 may not be an object that is updated except for updates to its state, its dependent objects may nonetheless be affected by that state update due to inheritance.

Database schema versions 115, in the context of hierarchy 250, may supersede the state of application version 260 in terms of inheritance of dependent objects. This may allow each schema version 115 to govern its objects independently of application version 260, ultimately enabling schema rotation. For example, if application version 260 were in active state 140 and database schema version 115B were in dormant state 142, objects 150 that depend on database schema version 115B may inherit dormant state 142 instead of active state 140 of application version 260.

As shown, the dependent objects of database schema version 115A include table 270, column 280, and trigger 290. Table 270 is a structured collection of data organized into rows and columns. Table 270 may be a table in database 110 that is used to store user data or a table forming the structure of a database schema version 115. As shown, table 270 has a state, and the features of the states assignable to table 270 may not be identical to the same state in another object. In some embodiments, a table 270 in active state 140 may allow more DDL operations than schema version 115A in active state 140. For example, active state 140 for table 270 may allow DDL operations for only a particular application version 260 while forbidding the DDL operations for any other application version 260. Column 280 defines a specific attribute or field of a database table. Trigger 290 is a procedure that is executed in response to specified events or actions on a particular objects (e.g., a table) in database 110. As trigger 290 may be independent of schema version 115 or application version 260, a non-active trigger 290 may still be dropped even in an active application version 260 or schema version 115. Other inheritance policies may be applied. For example, in some embodiments, the states of column 280 and trigger 290 are inherited from their parent table 270 and not schema version 115.

In various embodiments, multiple database schema version 115 can be simultaneously in active state 140. In one scenario, a single connection (e.g., from application 120) may want to access database objects 150 in more than one database schema version 115, which are thus all placed in active state 140 to service requests. In another scenario, there may be an overlap period during the schema update process where two different application versions 260 are being simultaneously used. In that scenario, each application version 260 has its own active database schema version 115 that is being accessed to service various requests.

Further, in various embodiments, the database object states may provide an additional dimension of access control. In particular, users (and/or roles) may be provided with specific privileges (e.g., access, update, etc.) on database objects. For example, a particular user may be granted permission to insert new records into a particular table 270 but not delete from it. If the particular table 270 is transitioned into dormant state 142, in various embodiments, the user is prevented from inserting new records into the particular table 270 even though the user has permission—that is, the database object states may supersede the privileges that are granted to users (and/or roles). Each object's state may be manipulated to regulate the operations that are performed on an object, based on the particular context/scenario of the system, regardless of the particular user. In some embodiments, the privileges granted to a particular user can be tied to certain states. For example, the particular user may be able to issue DML commands on a table 270 in active state 140 but not when that table 270 is in a maintain state, which permits DML commands.

Figure 3A:
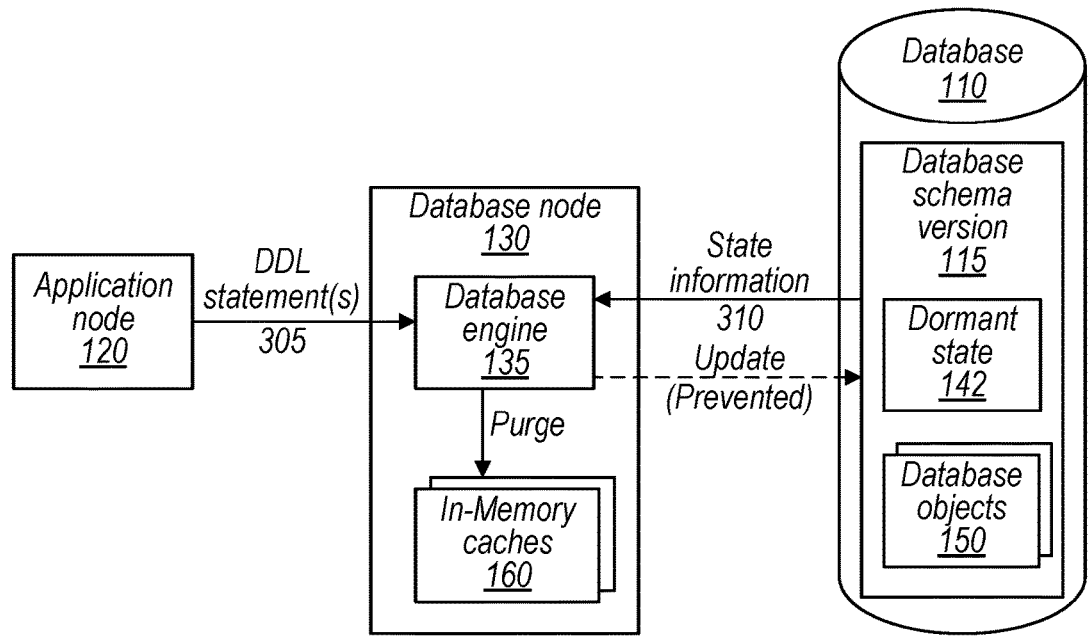
FIG. 3A is a block diagram illustrating example elements of a database node interacting with a database schema version in a dormant state, according to some embodiments.

Turning now to FIG. 3A, a block diagram of an example interaction between database node 130 and a database schema version 115 in dormant state 142 is shown. In the illustrated embodiment, there is database 110, application node 120, and database node 130. As shown, database 110 includes a database schema version 115 in dormant state 142, and database node 130 includes database engine 135 and in-memory caches 160.

Figure 3B:
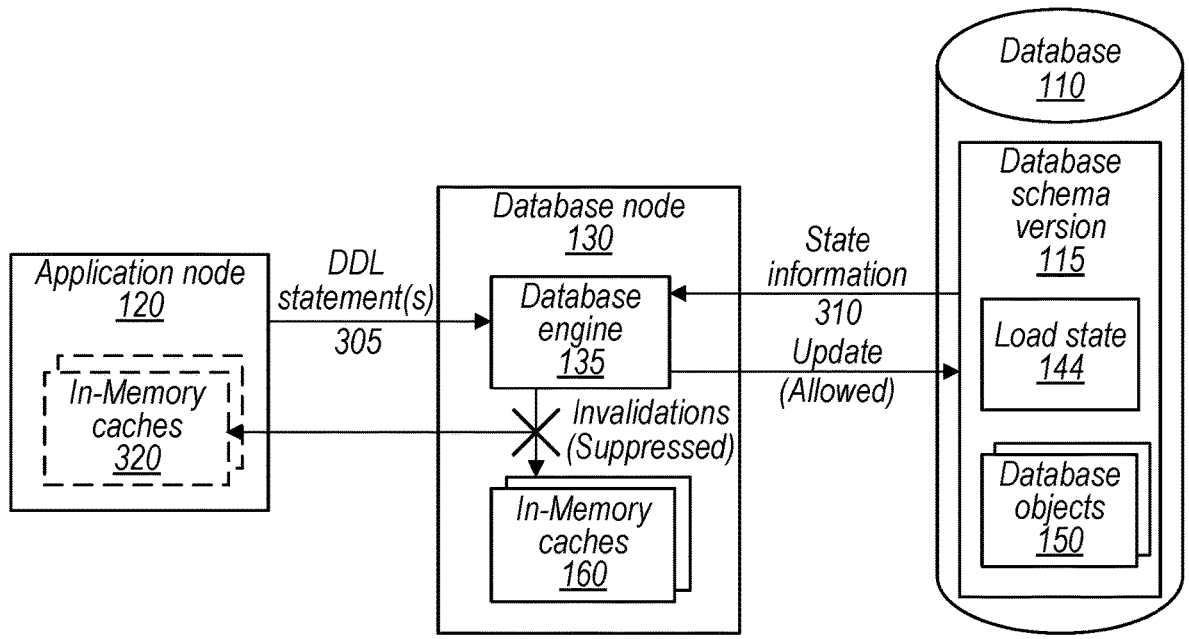
FIG. 3B is a block diagram illustrating example elements of a database node interacting with a database schema version in a load state, according to some embodiments.

As explained, database node 130 interacts differently with a database schema version 115 based on the schema version's state. As depicted in FIGS. 3A and 3B, application node 120 sends DDL statements 305 to database node 130 to modify database schema version 115. In response to receiving those DDL statements 305, database node 130 queries database schema version 115 to obtain its state information 310. State information 310, in various embodiments, identifies the current state (e.g., active state 140, dormant state 142, etc.) of its corresponding database schema version 115. In the illustrated embodiment, state information 310 indicates that database schema version 115 is in dormant state 142 in which it is currently not active but may become active later due to a database schema version rotation.

When database schema version 115 is in dormant state 142, in various embodiments, database engine 135 prevents DDL statements 305 from being performed on database schema version 115. As discussed, database schema versions 115 in dormant state 142 are protected from structural and content updates. This includes, for example, preventing updates specified by DDL statements that were previously permitted but were generated before database schema version 115 was transitioned to dormant state 142. But additional types of statements may also be blocked from being performed on database schema version 115. As noted, database engine 135 may prevent both data manipulation language (DML) statements (e.g., SELECT, INSERT, UPDATE, etc.) in addition to DDL statements 305. In some embodiments, database node 130 further notifies application node 120 (or any additional entities involved in issuing statements 305) that statements 305 were prevented.

Also as shown, database engine 135 may purge, from in-memory caches 160, database objects 150 from entries associated with database schema version 115 in dormant state 142. In particular, database schema versions 115 in dormant state 142 may no longer be accessed as a part of processing requests, and corresponding cached data is thus not accessed either. In some embodiments, the relevant entries of in-memory caches 160 are individually invalidated and subsequently evicted. But in various embodiments, all entries associated with dormant schema version 115 are invalidated as part of a mass invalidation and subsequently evicted from caches 160. This approach provides database node 130 with additional available space in caches 160 for data from an active database schema version 115 (e.g., objects 150 of the database schema version 115 in active state 140). In-memory caches 160 that store different types of database objects 150 may be purged. For example, plan caches and function caches of caches 160 may both be purged from entries associated with database schema versions 115 in dormant state 142. Database objects 150 may be stored in in-memory caches 160 as a part of least recently used (LRU) chains and thus database objects 150 may be entirely evicted from the LRU chains and those LRU chains deleted. Further, in various embodiments, application node 120 includes caches that are used to store database schema versions 115. Accordingly, those caches may be purged in a similar fashion. In some embodiments, database engine 135 performs similar cache purges for cached data corresponding to a schema version 115 in retire state 220.

Turning now to FIG. 3B, a block diagram of an example interaction between database node 130 and a database schema version 115 in load state 144 is shown. In the illustrated embodiment, there is database 110, application node 120, and database node 130. As shown, database 110 includes a database schema version 115 in dormant state 142, application node 120 includes in-memory caches 320, and database node 130 includes database engine 135 and in-memory caches 160. The illustrated embodiment might be implemented differently than shown. For example, database node 130 may detect, or otherwise receive an indication, that there are updates available to be applied to the database schema. Accordingly, database node 130 may access the updates (e.g., from a repository) and apply them instead of receiving the updates from application node 120 in the form of DDL statements 305.

A given database schema version 115 in load state 144 may currently not be active but is currently undergoing structural and/or content updates to become active in the next database schema rotation. Accordingly, in various embodiments, database engine 135, in response to determining that database schema version 115 is in load state 144, allows DDL statements 305 to be performed on database schema version 115 and also suppresses cache invalidations to caches 160 and 320 for entries that correspond to database schema version 115. In some cases, DDL statements 305 may cause tens of thousands of updates to database schema version 115. But these updates may result in as many cache invalidation messages for cache entries that are not being accessed by database node 130 and/or application node 120.

As mentioned, database objects 150 of a given database schema version 115 may be invalidated and evicted from caches 160 (and caches 320) when that database schema version 115 is transitioned into dormant state 140. Accordingly, when that given database schema version 115 is transitioned into load state 142, it is not cached in caches 160 (and/or caches 320). Any cache invalidation messages that result from updates to that database schema version 115 are unnecessary as they target data that is not cached and thus processing resources are wasted processing invalidation messages that do not change the state of the system, which can cause noticeable performance degradation (e.g., CPU spikes, I/O spikes, and APT spikes). It may thus be desirable to prevent the processing of these invalidation messages. Accordingly, in various embodiments, database engine 135 suppresses invalidation messages resulting from DDL statements 305 targeting database schema version 115 that is in load state 144 from being sent to in-memory caches 160 and 320, as shown. This suppression improves performance and reliability of system 100, as resources are not used to invalidate cache entries that are not being accessed anyway.

Figure 4:
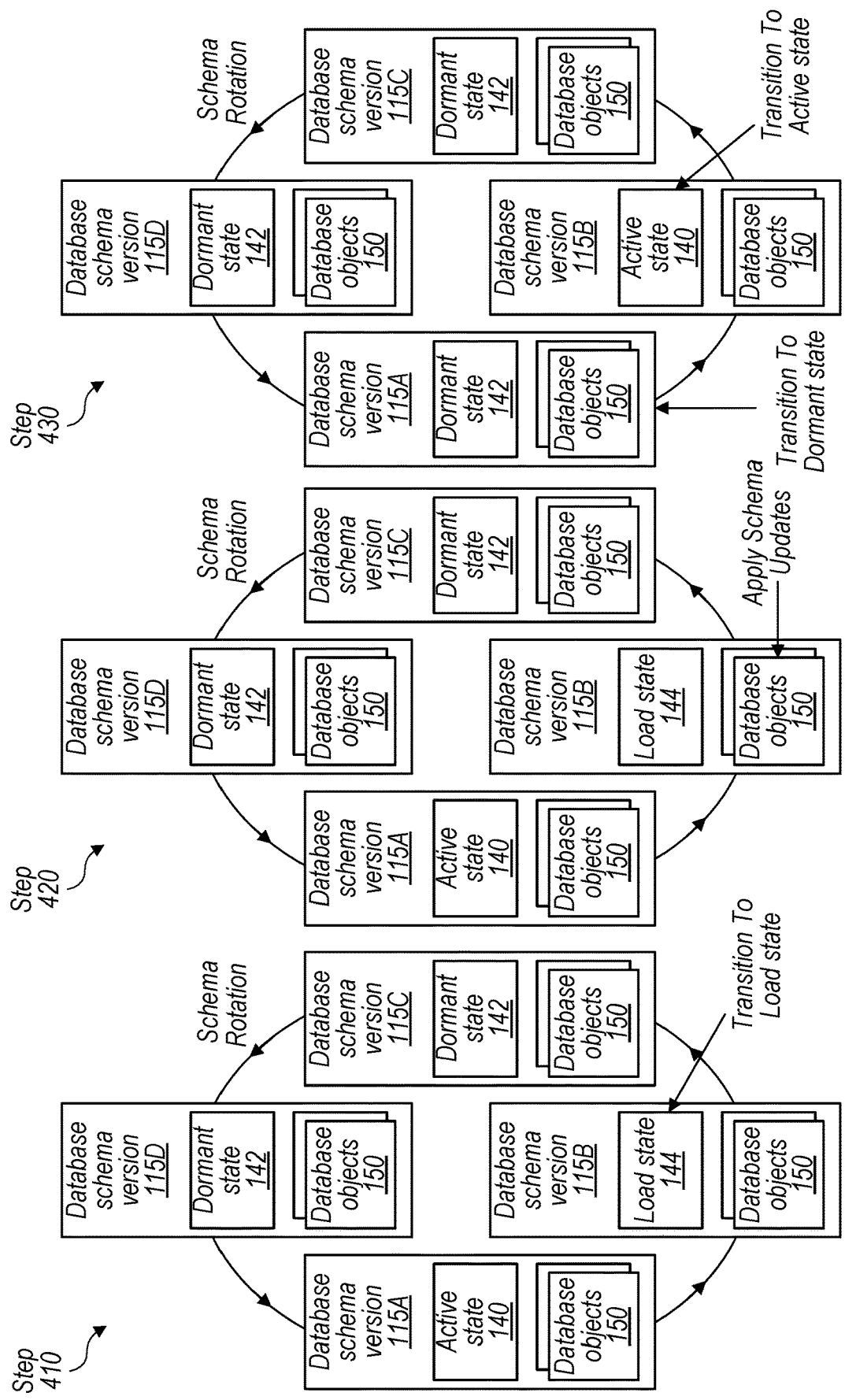
FIG. 4 is a block diagram illustrating an example database schema rotation that occurs during a schema update, according to some embodiments.

Turning now to FIG. 4, a block diagram illustrating an example database schema rotation during a database schema update is shown. As shown, the schema rotation begins with step 410 depicting a transition of schema version 115B from dormant state 142 to load state 144, continues at step 420 depicting schema updates being applied to schema version 115B, and completes at step 430 with a transition of schema version 115B to active state 140 and schema version 115A to dormant state 142.

As mentioned, the process shown in FIG. 4 may be used to update an application that uses database schema versions 115. In some embodiments, schema version 115A corresponds to an older version of an application while schema version 115B corresponds to an upgraded version of the application. The transitioning of schema version 115B into active state 140 may be part of a deployment operation of the upgraded version of the application, according to some embodiments. In various cases, the transitions of schema versions 115A-B in step 430 are accompanied by changes in traffic. Thus in some embodiments, the transitioning of schema version 115A into dormant state 142 is accompanied by the draining of incoming database traffic related to schema version 115A. Then, the transitioning of schema version 115B into active state 140 is conversely accompanied by redirecting of incoming database traffic related to schema version 115B.

Figure 5:
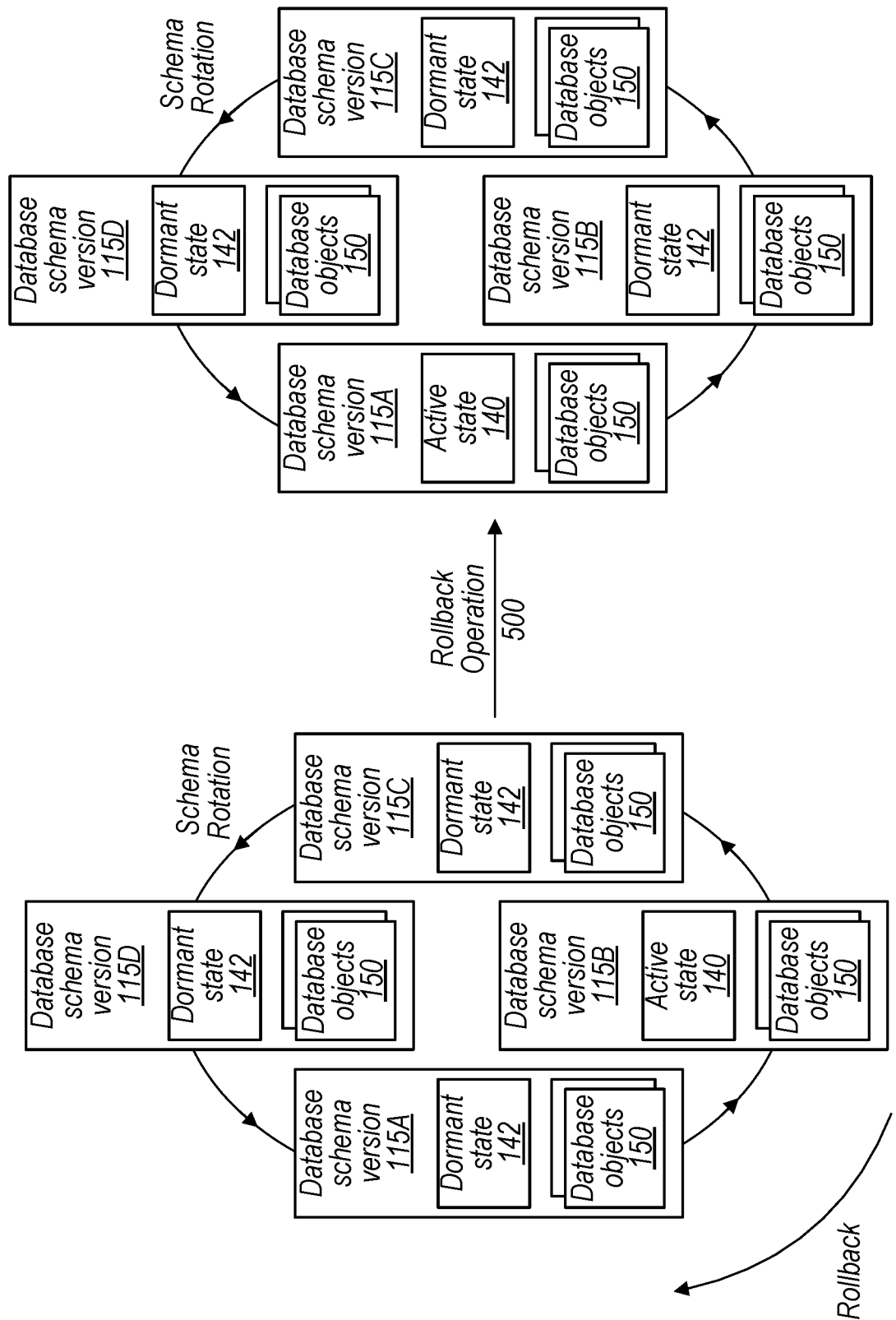
FIG. 5 is a block diagram illustrating an example database schema rotation that occurs during a rollback operation, according to some embodiments.

Since schema versions 115 are transitioned to dormant state 142 and are not deleted in various embodiments, it is possible to cycle through all schema versions as a given application is being updated. Thus, an additional update may perform steps similar to those shown in FIG. 4, where schema version 115B is transitioned to dormant state 142 while schema version 115C is transitioned to active state 140. Another advantage of schema versions 115 not being deleted when non-active is the ability to use older schema versions as backups. This may be helpful in cases where the update is faulty and developers need to roll back to a previous application version. FIG. 5 includes block diagrams that illustrate such a rollback operation.

Turning now to FIG. 5, block diagrams illustrating an example rollback operation 500 are shown. As shown, rollback operation 500 shows the rollback from newer schema version 115B to older schema version 115A. Thus, newer schema version 115B is transitioned from active state 140 to dormant state 142, and older schema version 115A from dormant state 142 to active state 140. In some embodiments, rollback operation 500 is accompanied by transitioning the incoming database traffic from database schema version 115B to database schema version 115A. Note that rollback operations are not only to the immediately preceding version. For example, there may be a rollback to schema versions 115C or 1151D, which are older than schema version 115A.

Figure 6:
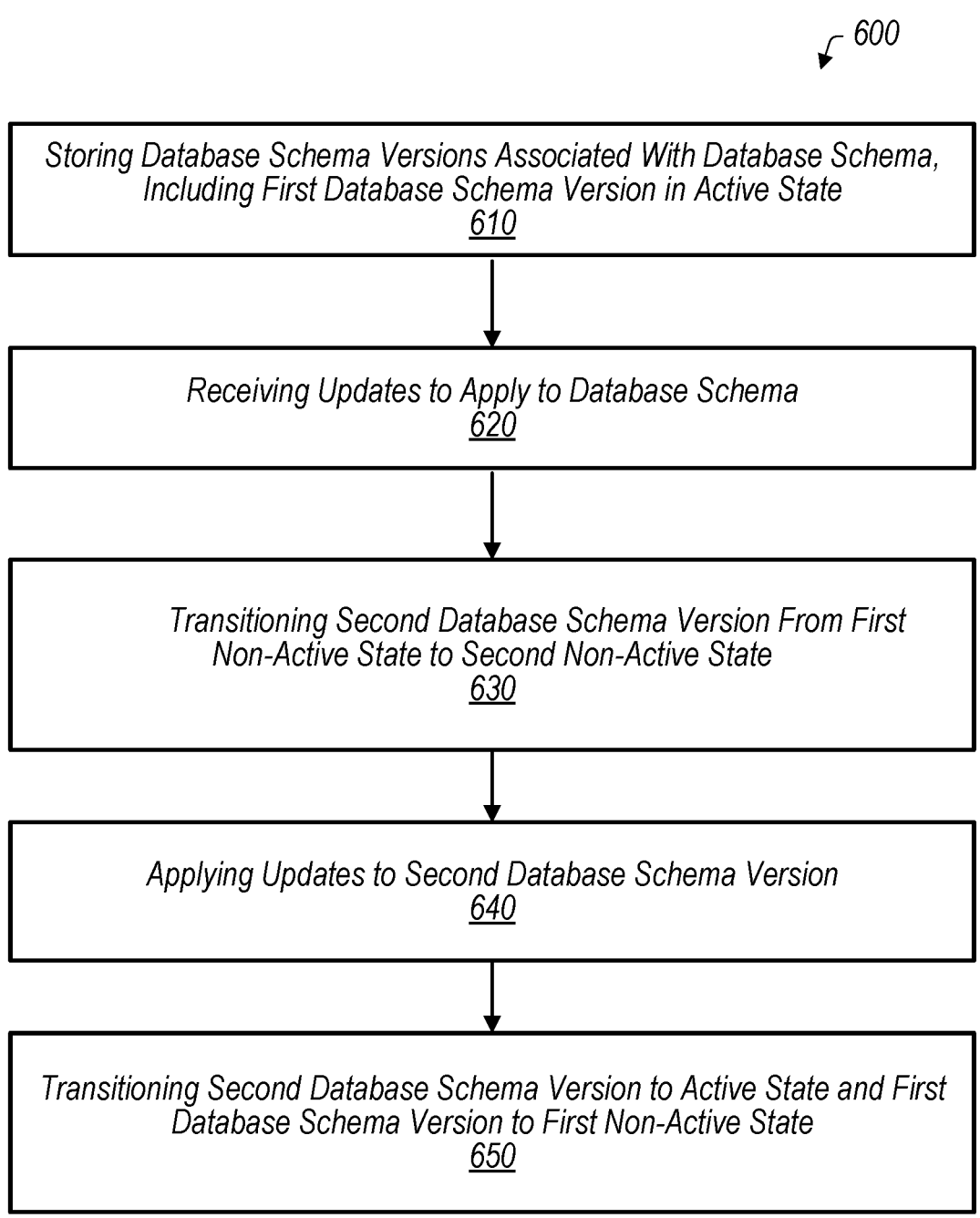
FIG. 6 is a flow diagram illustrating example methods relating to applying database schema version updates, according to some embodiments.

Turning now to FIG. 6, a flow diagram of a method 600 is shown. Method 600 is one embodiment of a method that is performed by a computer system (e.g., system 100) as part of applying database schema version updates. Method 600 may be performed by executing a set of program instructions stored on a non-transitory computer-readable medium. Method 600 may be performed in response to a schema update request (e.g., schema updates 125). In some embodiments, method 600 includes more or less steps than shown. For example, method 600 may include an additional step in which the system retires a third database schema version from the stored plurality of database schema versions.

Method 600 begins in step 610 with the computer system storing a plurality of database schema versions (e.g., schema versions 115) associated with a database schema, where a given database schema version has one of a plurality of states and defines a plurality of database objects (e.g., database objects 150) that can be used to facilitate processing of database transactions. In various embodiments, the plurality of states include an active state (e.g., active state 140) and at least two non-active states. A first one of the plurality of database schema versions may be in the active state while the remaining ones of the plurality of database schema versions are in one of the non-active states that include a first non-active state (e.g., dormant state 142) that does not permit structural or content updates to a database schema version, and a second non-active (e.g., load state 144) state that permits structural and content updates to a database schema version.

In step 620, the computer system receives one or more updates (e.g., schema updates 125) to apply to the database schema. In step 630, the computer system transitions a second database schema version (e.g., schema version 115A) of the plurality of database schema versions from the first non-active state to the second non-active state. The transitioning, in some embodiments, is caused by a query language statement specifying the second database schema version and the second non-active state.

In step 640, the computer system applies the one or more updates to the second database schema version. The database schema version may include a variety of objects such as tables that inherit the schema version's state. In some embodiments, the second database schema version defines a plurality of database objects that includes a database table that inherits state from the second database schema version. The computer system may apply, based on the second database schema version being in the second non-active state, an update to the database table as part of applying the one or more updates and prevent, based on the second database schema version being in the first non-active state, updates to the database table.

The computer system may suppress cache invalidation messages for schemas in the second non-active state. In some embodiments, the computer system may store, in a set of caches by the computer system, one or more of a plurality of database objects defined by the first database schema version, where particular updates to a database schema version results in cache invalidation messages being sent to the set of caches. Then, while the second database schema version is in the second non-active state, the computer system may suppress cache invalidation messages from being sent to the set of caches for the one or more updates when applying the one or more updates to the second database schema version. The computer system may, prior to receiving the one or more updates, transition the second database schema version to the first non-active state, including invalidating all database objects stored in the set of caches that are associated with the second database schema version. Yet further, the database objects associated with the second database schema version may be stored in the set of caches as part of a plurality of Least Recently Used (LRU) chains that order the database objects associated with the second database schema version. The computer system may accordingly empty the plurality of LRU chains after the invalidating of the database objects associated with the second database schema version.

In step 650, the computer system transitions the second database schema version (e.g., schema version 115A) to the active state and the first database schema version (e.g., schema version 115C) to the first non-active state. The transitioning, in some embodiments, further includes the computer system allowing a draining of database traffic related to the first database schema version and redirecting incoming database traffic so that the incoming database traffic uses the second database schema version. The computer system may transition a third database schema version of the plurality of database schema versions to the active state such that the second database schema version and the third database schema version are simultaneously in the active state. The computer system may execute a set of database transactions using both the second database schema version and the third database schema version in the active state.

In some embodiments, the computer system may attempt to perform a schema update on a database schema in a dormant state. The computer system may receive an update to apply to a third database schema version of the plurality of database schema versions. The computer system may, in response to detecting that the third database schema version is in the first non-active state, prevent the update to the third database schema version and notify an issuer of the update that the update was prevented.

Thus, the method may be used to perform an application version upgrade. In some embodiments, the first database schema version corresponds to an older version of an application that utilizes the first database schema version, the second database schema version corresponds to an upgraded version of the application that utilizes the second database schema version, and the transitioning of the second database schema version into the active state is part of a deployment operation of the upgraded version of the application.

The computer system may also perform a rollback operation using database schema versions. In some embodiments, the computer system receives a notification to cause a rollback to a third database schema version in the first non-active state, and transitions, based on the receiving of the notification, the third database schema version into the active state and the second database schema version into the first non-active state.

The schema version rotation may be cyclical, where the database schema versions return to their states prior to the first update request. In some embodiments, the computer system receives, after the transitioning of the first database schema version into the first non-active state, additional updates to apply to the database schema. The computer system may then then transition the first database schema version from the first non-active state to the second non-active state, apply the additional updates to the first database schema version, and transition the first database schema version into the active state and a database schema version that is in the active state into the first non-active state.

Exemplary Computer System

Figure 7:
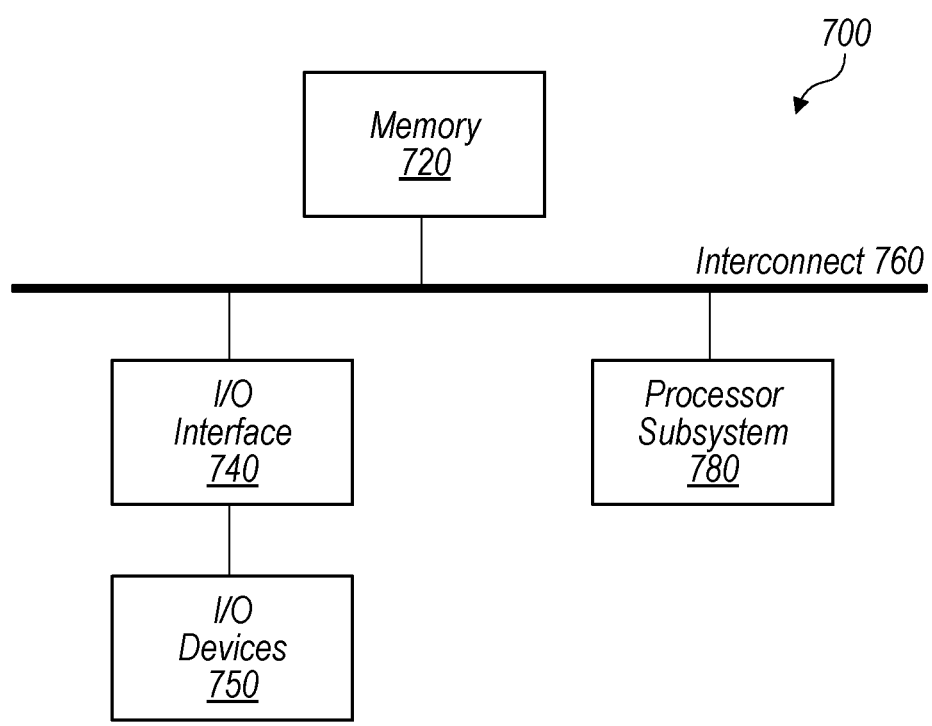
FIG. 7 is a block diagram illustrating elements of a computer system for implementing various systems described in the present disclosure, according to some embodiments.

Turning now to FIG. 7, a block diagram of an exemplary computer system 700, which may implement system 100, database 110, application node 120, and/or database node 130, is depicted. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Although a single computer system 700 is shown in FIG. 7 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable store program instructions executable by processor subsystem 780 to cause system 700 perform various operations described herein. System memory 720 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780. In some embodiments, program instructions that when executed implement database engine 135 and caches 160 may be included/stored within system memory 720.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:
   storing, by a computer system, a plurality of database schema versions associated with a database schema, wherein a given database schema version has one of a plurality of states and defines a plurality of database objects, wherein a first one of the plurality of database schema versions is in an active state in which the first database schema version is used to process database traffic and remaining ones of the plurality of database schema versions are in one of at least two other states in which the remaining database schema versions are not used to process the database traffic, wherein the other states include:
      a dormant state that does not permit structural or content updates to a database schema version; and
      a load state that permits structural and content updates to a database schema version in preparation to transition to the active state, wherein the active state, the dormant state, and the load state form a cycle;
   receiving, by the computer system, one or more updates to apply to the database schema;
   transitioning, by the computer system, a second one of the plurality of database schema versions from the dormant state to the load state;
   applying, by the computer system, the one or more updates to the second database schema version; and
   transitioning, by the computer system, the second database schema version into the active state and the first database schema version into the dormant state.

2. The method of claim 1, further comprising:
   storing, in a set of caches by the computer system, one or more of a set of database objects defined by the first database schema version, wherein particular updates to a database schema version result in cache invalidation messages being sent to the set of caches; and
   while the second database schema version is in the load state, the computer system suppressing, when applying the one or more updates to the second database schema version, cache invalidation messages from being sent to the set of caches for the one or more updates.

3. The method of claim 2, further comprising:
   prior to receiving the one or more updates, the computer system transitioning the second database schema version to the dormant state, including invalidating all database objects stored in the set of caches that are associated with the second database schema version.

4. The method of claim 1, further comprising:
   transitioning, by the computer system, a third database schema version of the plurality of database schema versions to the active state, wherein the second database schema version and the third database schema version are simultaneously in the active state; and
   executing, by the computer system, a set of database transactions using both the second database schema version and the third database schema version in the active state.

5. The method of claim 1, wherein the transitioning of the second database schema version into the active state and the first database schema version into the dormant state includes:
   allowing a draining of database traffic related to the first database schema version; and
   redirecting incoming database traffic so that the incoming database traffic uses the second database schema version.

6. The method of claim 1, further comprising:
   receiving, by the computer system, an update to apply to a third database schema version of the plurality of database schema versions;

in response to detecting that the third database schema version is in the dormant state, the computer system preventing the update to the third database schema version; and
notifying, by the computer system, an issuer of the update that the update was prevented.

7. The method of claim 1, further comprising:
receiving, by the computer system, a notification to cause a rollback to a third database schema version that is in the dormant state; and
transitioning, by the computer system based on the receiving of the notification, the third database schema version into the active state and the second database schema version into the dormant state.

8. The method of claim 1, wherein the transitioning of the second database schema version into the load state is caused by a query language statement specifying the second database schema version and the load state.

9. The method of claim 1, wherein the second database schema version defines a set of database objects that includes a database table that inherits state from the second database schema version, and wherein the method further comprises:
applying, by the computer system based on the second database schema version being in the load state, an update to the database table as part of applying the one or more updates; and
preventing, by the computer system based on the second database schema version being in the dormant state, updates to the database table.

10. The method of claim 1, wherein:
the first database schema version corresponds to an older version of an application that utilizes the first database schema version;
the second database schema version corresponds to an upgraded version of the application that utilizes the second database schema version; and
the transitioning of the second database schema version into the active state is part of a deployment operation of the upgraded version of the application.

11. A non-transitory computer readable medium having program instructions stored thereon that are executable by a computer system to cause the computer system to perform operations comprising:
storing a plurality of database schema versions associated with a database schema, wherein a given database schema version has one of a plurality of states and defines a plurality of database objects, wherein a first one of the plurality of database schema versions is in an active state in which the first database schema version is used to process database traffic from an application node and remaining ones of the plurality of database schema versions are in one of at least two other states in which the remaining database schema versions are not used to process the database traffic, wherein the other states include:
a dormant state that does not permit structural or content updates to a database schema version; and
a load state that permits structural and content updates to a database schema version in preparation to transition to the active state, wherein the active state, the dormant state, and the load state form a cycle;
receiving one or more updates to apply to the database schema;
transitioning a second one of the plurality of database schema versions from the dormant state to the load state;
applying the one or more updates to the second database schema version; and
transitioning the second database schema version into the active state and the first database schema version into the dormant state.

12. The non-transitory computer readable medium of claim 11, wherein the operations further comprise:
storing, in a set of caches, one or more of a set of database objects defined by the first database schema version, wherein the set of caches do not store database objects associated with the second database schema version while the second database schema version is in the load state, and wherein particular updates to a database schema version result in cache invalidation messages being sent to the set of caches; and
while the second database schema version is in the load state, suppressing, when applying the one or more updates, cache invalidation messages from being sent to the set of caches for the one or more updates.

13. The non-transitory computer readable medium of claim 12, wherein the operations further comprise:
prior to receiving the one or more updates, the computer system transitioning the second database schema version to the dormant state, including invalidating all database objects stored in the set of caches that are associated with the second database schema version.

14. The non-transitory computer readable medium of claim 11, wherein the operations further comprise:
prior to the transitioning of the second database schema version to the load state:
receiving an update to apply to the second database schema version;
in response to detecting that the second database schema version is in the dormant state, preventing the update to the second database schema version; and
returning an error to an issuer of the update.

15. The non-transitory computer readable medium of claim 11, wherein the operations further comprise retiring a third database schema version that is in the dormant state from the stored plurality of database schema versions.

16. A system, comprising:
at least one processor; and
memory having program instructions stored thereon that are executable by the at least one processor to cause the system to perform operations comprising:
storing a plurality of database schema versions associated with a database schema, wherein a given database schema version has one of a plurality of states and defines a plurality of database objects, wherein a first one of the plurality of database schema versions is in an active state in which the first database schema version is used to process database traffic from application users to access data from a database and remaining ones of the plurality of database schema versions are in one of at least two other states in which the remaining database schema versions are not used to process the database traffic, wherein the other states include:
a dormant state that does not permit structural or content updates to a database schema version; and
a load state that permits structural and content updates to a database schema version in preparation to transition to the active state, wherein the active state, the dormant state, and the load state form a cycle;
receiving one or more updates to apply to the database schema;

transitioning a second one of the plurality of database schema versions from the dormant state to the load state;

applying the one or more updates to the second database schema version; and transitioning the second database schema version into the active state and the first database schema version into the dormant state.

17. The system of claim 16, wherein the operations further comprise:

storing, in a set of caches, a set of database objects, wherein particular updates to a database schema version result in cache invalidation messages being sent to the set of caches; and while the second database schema version is in the load state, suppressing, when applying the one or more updates, cache invalidation messages from being sent to the set of caches for the one or more updates.

18. The system of claim 17, wherein the operations further comprise:

prior to receiving the one or more updates, transitioning the second database schema version to the dormant state, including invalidating one or more database objects stored in the set of caches that are associated with the second database schema version.

19. The system of claim 16, wherein the operations further comprise:

prior to the transitioning of the second database schema version to the load state:

receiving an update to apply to the second database schema version;

in response to detecting that the second database schema version is in the dormant state, preventing the update to the second database schema version; and returning an error to an issuer of the update.

20. The system of claim 16, wherein the operations further comprise:

receiving, after the transitioning of the first database schema version into the dormant state, additional updates to apply to the database schema;

transitioning the first database schema version from the dormant state to the load state;

applying the additional updates to the first database schema version; and transitioning the first database schema version into the active state and a database schema version that is in the active state into the dormant state.

* * * * *